Feb. 23, 1932.  A. L. HOWARD  1,846,203
GASKET
Filed Nov. 5, 1929
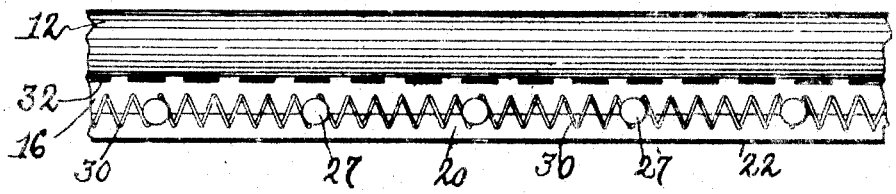
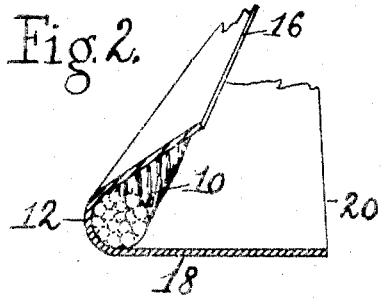 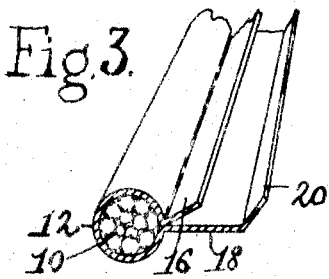
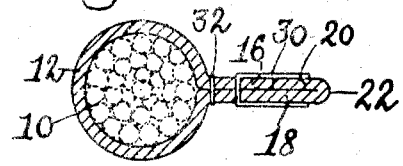
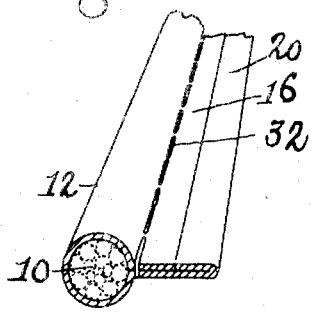 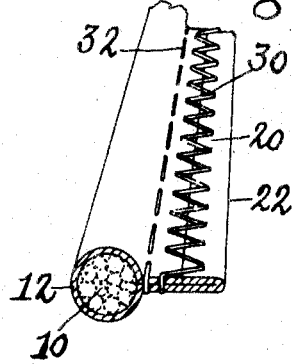
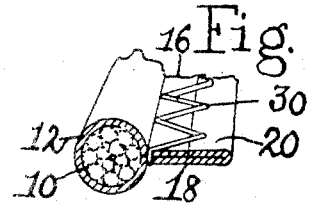
INVENTOR.
Albert L. Howard
BY
Jas. H. Churchill
ATTORNEY.

Patented Feb. 23, 1932

1,846,203

UNITED STATES PATENT OFFICE

ALBERT L. HOWARD, OF BROCKTON, MASSACHUSETTS, ASSIGNOR TO HAMILTON-WADE COMPANY, OF BROCKTON, MASSACHUSETTS, A CORPORATION

GASKET

Application filed November 5, 1929. Serial No. 404,966.

This invention relates to a gasket and more particularly to a gasket adapted for use as a packing around refrigerator doors, and as a weather strip for windows, doors, and the like.

The object of the invention is to provide a novel, simple, and efficient gasket of the type comprising a roll of packing material having an envelop enclosing the roll and provided with ends which are extended laterally from the roll to form a tacking lap of substantial width, which may be more economically manufactured than other gaskets of this type of which I am aware, and which may be used for all of the purposes for which such gaskets are now used.

With this object in view, and such others as may hereinafter appear, the invention consists in the gasket hereinafter described and particularly defined in the claims at the end of this specification.

In the drawings illustrating the preferred embodiment of the invention,

Fig. 1 is a plan view of a portion of the present gasket;

Fig. 2, a perspective of the packing roll with the envelop partially wrapped around the same;

Fig. 3, a similar view illustrating a succeeding stage in the formation of the present gasket;

Fig. 4, a vertical sectional view of the present gasket;

Fig. 5, a perspective of the present gasket, and

Figs. 6 and 7, perspective views illustrating modifications of the present gasket and which embody the present invention.

In general the present invention is embodied in a gasket of the general type now used in connection with the sealing of refrigerator doors, and as weather strips for doors, windows, and the like, and in which a roll of yieldable packing material is enclosed within an envelop to maintain the roll of packing material in substantially tubular form capable of yielding under pressure and of returning to its tubular form when the pressure is relieved.

The enveloping material may comprise any of the flexible materials now used in the construction of such gaskets, such as fabric, rubber, rubberized fabric, and the like. The ends of the envelop are arranged to extend laterally from the tubular portion of the gasket to form a tacking lap or flange of substantial width, and in accordance with the present invention provision is made for forming the tacking lap in a novel and superior manner, and one in which a minimum amount of the enveloping material is required to be used, while at the same time producing a strong, durable and efficient tacking lap.

To this end, the free ends of the envelop are made of unequal width and the outer portion of the wider of such ends is folded upon itself, forming a finished side edge, and with the narrower end is secured to the unfolded portion of the wider end to form the tacking lap, preferably with the edges of such folded portion and of the narrower end in substantial abutment.

In the preferred embodiment of the invention provision is made for stitching the folded portion and the narrower end of the envelop to the unfolded portion of the wider end by a longitudinally extended row of stitches and with each stitch extending transversely across the junction between the edges of the folded portion and the narrower end.

In order to insure the maintenance of the packing in tubular form, I may prefer to provide an additional line of stitches through the tacking lap in a position adjacent the junction with the tubular body portion.

Referring now to the drawings, 10 represents a roll of packing material, preferably of the type now employed in the production of gaskets of the present general type. The roll 10 is enclosed within an envelop 12, preferably formed of a single piece of a flexible wrapping material, such as fabric, rubber, rubberized fabric, or any of the other materials now commonly used in the production of gaskets of this type, and which is wrapped around the roll 10 to enclose the same and to thus form a tubular body or sealing portion.

The envelop 12 is wrapped around the roll 10 in a manner such as to leave free ends 16, 18 of the wrapper extending laterally from one side of the body portion of the gasket. The outer portion 20 of the wider end 18 is folded to form a closed or finished outer edge 22 of the tacking lap and co-operate with the narrower end 16 to form one of the plies of the tacking lap.

The outer portion 20 may and preferably will be folded over directly upon the unfolded portion of the wider end 18 in a position in which the edge of the folded portion closely abuts the edge of the narrower end 16, so that a construction of tacking lap may be produced comprising two plies and in which the seam between the abutting edges is located substantially centrally of the tacking lap in a position in which it may come under some of the tacks 27 used in tacking the lap during the use of the gasket.

In order to hold the folded portion 20 of the wider end 18 in its position, as well as to hold the narrower end 16 in a position such as to maintain the roll of packing in substantially tubular form, it is preferred to stitch by means of a zigzag stitch 30 back and forth through the folded portion 20 and through the narrower end 16, producing a structure such as is illustrated in Figs. 1, 4 and 5. In order to facilitate the stitching operation, it is preferred to adhesively affix the narrower end 16 and the folded portion 20 to the unfolded portion of the wider end 18 preferably by the application of a thin layer of cement, glue, or other known adhesive.

From the description thus far, and from an inspection of the drawings, it will be observed that a gasket produced as above described requires a minimum amount of enveloping material 12; that practically no more enveloping material is utilized than in the production of the two-ply gasket of this general type in which the edges of the plies comprising the tacking lap were left raw and unfinished.

The single line of stitches contributes to the economy of manufacture of the gasket, requiring only the single operation, and in addition the transversely extended threads operate to securely hold down the free edges of the ends of the envelop and reinforce the junction between the ends to provide substantially as strong a ply as if the ply were made up of a continuous strip.

In order to assist in maintaining the roll of packing in tubular form, I may prefer in manufacturing gaskets for some purposes to employ an additional line of stitches 32 through both ends comprising the tacking lap at a point near the junction of the lap with the tubular body portion of the gasket, such position being indicated in Figs. 1 and 4, and such stitches may be regarded as desirable in those instances where it is desired to eliminate any chance of the ends of the gasket becoming detached if the main line of transverse stitches should become broken. In most instances, however, it is thought that the tacks 27 (see Fig. 1) would operate to hold the abutting edges of the ends 16, 18.

While it is preferred to employ both the zigzag line of stitches and the auxiliary stitches, for some purposes either may be used alone, producing a construction of gasket such as is indicated in Figs. 6 and 7.

In producing the gasket illustrated in Fig. 6, I may prefer to adhesively or otherwise affix the folded portion 20 and the narrower end 16 to the unfolded portion of the wider end 18. In those instances where it is desirable to employ only a single line of stitches, a satisfactory gasket may be produced according to the structure illustrated in Fig. 7, in which the zigzag stitches are arranged to extend across the joint between the edges of the folded portion 20 and the narrower end 16, and at the same time to secure together the ends 16, 18 at the point of junction between the tubular body of the envelop and the tacking lap, as shown in Fig. 7, thus operating to efficiently maintain the packing in a tubular efficient form.

From the above description of the preferred and modified forms of the invention, it will be observed that the construction of the present gasket is such as to provide the desirable closed edge or folded edge on the tacking lap and that this is accomplished utilizing substantially no more enveloping material than has heretofore been required in the production of the commercial two-ply gasket of the prior art in which the tacking lap was formed by the two ends of the enveloping material equal in length and in which the edge of the tacking lap was necessarily open and unfolded, and consequently in a condition in which in practice moisture could readily enter. In addition, by utilizing a waxed or moisture-proof thread, it is possible to produce a strong, durable, and economical gasket by means of the single row of stitches with threads of individual stitches extending transversely across the junction of the abutting edges of the portions 16 and 20.

While the preferred embodiments of the invention have been herein illustrated and described, it will be understood that the invention may be embodied in other forms within the scope of the following claims.

Having thus described the invention, what is claimed is:

1. A gasket comprising a roll of packing, an envelop enclosing the roll and secured to maintain the roll in tubular form with the ends of the envelop extending from the roll to form a two-ply tacking lap of substantial width, said ends of the envelop being of unequal width and the end of greater width being folded over to form a folded side edge of the tacking lap, the edges of the ends being in abutting relationship.

2. A gasket comprising a roll of packing, an envelop enclosing the roll with free ends of the envelop extending from the roll to form a tacking lap of substantial width, said ends being of unequal width and the wider of said ends being folded over upon its self to form a folded side edge of the tacking lap and with the edge of said folded portion proximate to the edge of the narrower end of said envelop, and means for securing the ends in such relation said means comprising a row of transverse stitches.

3. A gasket comprising a roll of packing, an envelop enclosing the roll with the ends of the envelop extending from the roll to form a tacking lap of substantial width, said ends being of unequal width with the wider of said ends folded to form a folded side edge of the tacking lap and with the folded portion of said end co-operating with the narrower end of the envelope to form the upper ply of the tacking lap, and stitching for securing the folded portion of the wider end and also the narrower end in such position and to the unfolded portion of the wider end.

4. A gasket comprising a roll of packing, an envelop enclosing the roll with free ends of the envelop extending from the roll to form a tacking lap of substantial width, said ends being of unequal width and the wider of said ends being folded to form a folded side edge, and a row of transversely extended stitches for securing the folded portion of the wider end and the narrower end to the unfolded portion of the wider end.

5. A gasket comprising a roll of packing, an envelop enclosing the roll with free ends of the envelope extending from the roll to form a tacking lap of substantial width, said ends being of unequal width and the wider of said ends being folded to form a folded side edge and with the folded portion substantially abutting the side edge of the narrower end, stitching for securing the folded portion and the narrower end to the unfolded portion of the wider end, and an auxiliary line of stitching through said ends adjacent the roll of packing.

6. A gasket comprising a roll, an envelop enclosing the roll with the ends of the envelop extending to form a tacking lap of substantial width, said ends being of unequal width and the wider being folded over to form a folded side edge and into substantial abutment with the narrower of said ends, said ends being arranged so that the junction between the abutting edges lies substantially midway of the tacking lap, and means for securing the said folded portion and narrower end to the unfolded portion of the wider end.

7. A gasket comprising a roll, an envelop enclosing the roll with the ends of the envelop extending to form a tacking lap of substantial width, said ends being of unequal width and the wider being folded over to form a folded side edge and into substantial abutment with the narrower of said ends, said ends being arranged so that the junction between the abutting edges lies substantially midway of the tacking lap, and stitches extending through the tacking lap thus formed upon opposite sides of said junction.

8. A gasket comprising a roll, an envelop enclosing the roll with the ends of the envelop extending to form a tacking lap of substantial width, one of said ends being folded to form a folded side edge, and a row of transversely extended stitches for securing the folded portion to the remainder of the tacking lap.

9. A gasket comprising a roll, an envelop enclosing the roll with the ends of the envelop extending to form a tacking lap of substantial width, said ends being of unequal width and the wider of said ends being folded to form a folded side edge and with the folded portion substantially abutting the side edge of the narrower end, and a row of transversely extended stitches arranged in sufficient proximity to the junction between the tacking lap and roll to maintain the roll in tubular form and serving also to secure the folded portion of the wider end and the narrower end to the unfolded portion of the wider end.

10. A gasket comprising a packing, a fabric covering therefor extending from one side of the packing to form a multi-ply tacking flange, and stitches passing through the flange at substantially right angles to the longitudinal edge thereof.

11. A gasket comprising a packing, a fabric covering therefor extending from one side of the packing to form a multi-ply tacking flange, and a zigzag line of stitching passing through the plies of the flange.

12. A gasket comprising a packing, a fabric covering therefor extending from one side of the packing to form a multi-ply tacking flange, and a single line of stitching disposed in zigzag configuration across the flange, the inner points thereof lying along the extreme inner edge of the tacking flange to confine the packing in the fabric covering.

13. A gasket comprising a packing, a fabric covering therefor, portions of the covering extending outwardly from one side of the packing to form a multi-ply tacking flange, and a zigzag line of stitching passing through the plies of the flange, the outer points thereof being in close proximity to the outer edge of the flange.

14. A gasket comprising a packing, a fabric covering therefor, portions of the covering extending outwardly from one side of the packing to form a multi-ply tacking flange, and a zigzag line of stitching passing through the plies of the flange, the inner points thereof lying along the extreme inner edge of the tacking flange to confine the packing in the fabric covering, and the outer points thereof being in close proximity to the outer edge of the flange to hold the plies tightly together along the outer edge of the flange.

In testimony whereof, I have signed my name to this specification.

ALBERT L. HOWARD.